United States Patent [19]

Ruppel et al.

[11] 4,024,497

[45] May 17, 1977

[54] TRAILER PROTECTOR LIGHT SYSTEM

[76] Inventors: Raymond A. Ruppel, Route No. 5, Vincennes, Ind. 47591; Joseph Z. Fagle, 1304 Collins, Lawrenceville, Ill. 62439; Theodore W. Blagrave, 703 S. Ninth, Vincennes, Ind. 47591

[22] Filed: Sept. 16, 1975

[21] Appl. No.: 613,800

[52] U.S. Cl. .............................. 340/74; 340/81 R; 340/91
[51] Int. Cl.² .......................................... B60Q 1/26
[58] Field of Search ............. 340/74, 75, 81 R, 89, 340/91, 100; 240/7.1 A; 307/10 R, 10 LS; 315/77

[56] References Cited

UNITED STATES PATENTS

| | | | |
|---|---|---|---|
| 2,203,502 | 6/1940 | Michel | 240/7.1 A |
| 3,564,497 | 2/1971 | Gazzo | 340/70 X |
| 3,671,757 | 6/1972 | Klein | 307/10 LS |

*Primary Examiner*—Donald J. Yusko
*Attorney, Agent, or Firm*—Clarence A. O'Brien; Harvey B. Jacobson

[57] ABSTRACT

A protector lighting system for use with tractor-trailer type vehicles having a unique arrangement for connecting additional lights to the existing light wiring of the trailer. The system is connected in such a manner that the additional protecting lights are only energized when the existing running lights of the trailer are energized, and the turn signal lighting system is energized.

12 Claims, 2 Drawing Figures

TRAILER PROTECTOR LIGHT SYSTEM

BACKGROUND OF THE INVENTION

1. Field of the Invention

This invention relates generally to a lighting protection system for trailer units of what is commonly known as tractor-trailer rigs.

2. Description of the Prior Art

A common problem with operating tractor-trailer rigs at night is for an operator to cut a corner too short and thereby scrape the rear of the trailer against a curb, parked car, or a corner light post, etc. When such an accident occurs it has been a common excuse that the operator could not see where the rear of the tractor was because it was too dark. Other common type accidents would be for an operator to lose a wheel in a ditch when crossing a four lane highway or making a U-turn on a highway.

The prior art shows various type lighting devices for attachment to motor vehicles to allow the operator to see the side edges of the road and/or the vehicle itself. None of these prior art devices, however, are arranged for the simple electrical installation as is disclosed in this invention. Existing prior patents which may be pertinent to this invention are as follows: U.S. Pat. Nos. 1,496,140, issued June 3, 1924 to S. S. Tuttle; 1,535,894, issued Apr. 28, 1925 to R. T. Biddle; 1,611,706, issued Dec. 21, 1926 to E. I. Adolphson et al; 3,023,344, issued Feb. 27, 1962 to J. L. Owings; 3,017,500, issued Jan. 16, 1962 to H. A. Pezzopane; and 3,457,397, issued July 22, 1969 to M. E. Tindall.

SUMMARY OF THE INVENTION

An object of the present invention is to provide a trailer protector lighting system which is easily connectible to the existing wiring in such trailers.

Another object of this invention is to provide a light protecting system which only operates when the existing lighting systems of the trailer are energized.

A further object of this invention is to provide a novel lighting protecting system for trailers which is easily connectible to the existing wiring, and only will operate when the running light system of the trailer is energized and only when at least part of the turn signal lighting system is energized.

A still further object of this invention is to provide additional protecting lights in the form of backup lights which are only energizable when the existing running light system is energized and the turn signal system is energized in the emergency position.

One of the big advantages of the novel system disclosed herein is the fact that no extra wiring is needed between the tractor and the trailer. This system is very easy to install and service, and will provide the extra protection which a driver needs in order to avoid the accidents which are common in the field. Such accidents as occur when the driver turns a little too short. These have been most common at night because of the difficulty for the operator in seeing the rear portion of the trailer.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
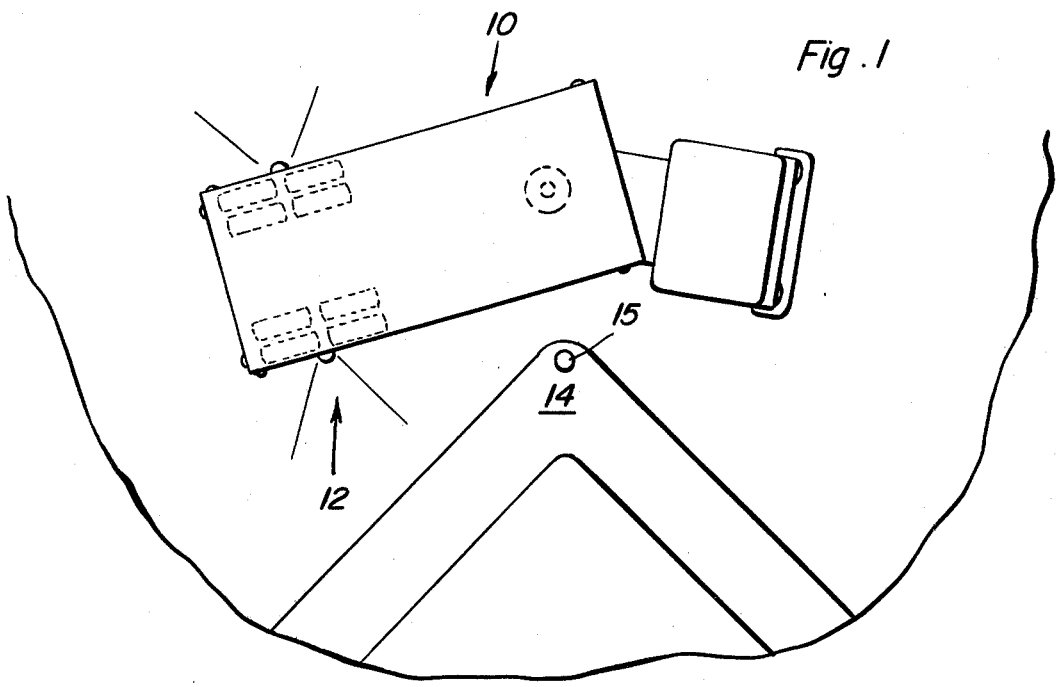
FIG. 1 is a top plan view of the simplest form of this invention as applied to a tractor-trailer rig.

Referring to FIG. 1 of the drawing reference numeral 10 indicates the tractor-trailer rig as it is turning a corner 14. A lamp post 15 is indicated on said corner. A simple version of the lighting protecting system is shown in general by reference numeral 12. This shows a single side protecting light mounted on each side of the trailer. The lights are placed quite close to and above the rear wheels of the trailer.

Figure 2:
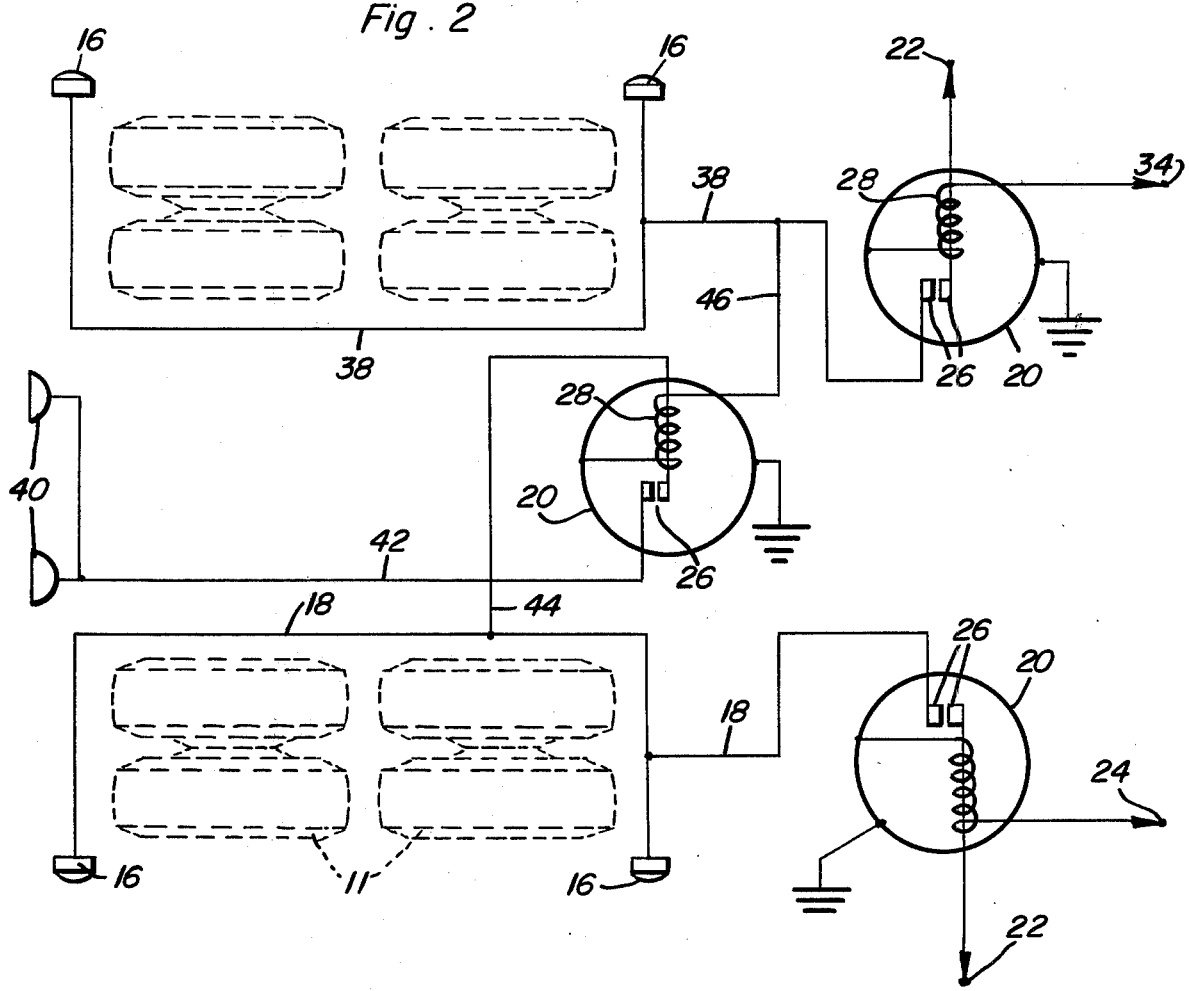
FIG. 2 is a schematic diagram illustrating the novel circuit connections for this system.

FIG. 2 shows a schematic of the lighting system and the more common application thereof which includes two side lights on each side of the trailer. These side lights are illustrated by reference numerals 16. As indicated on the schematic these lights 16 are placed front and rear of the tandem wheels 11 and of course would be mounted somewhat above the wheels. The lower set of lights 16 which as indicated would be the right side of the trailer are connected by means of wiring 18 to a switch relay 20. This switch relay 20 is preferably of the thermal delay activative type with normally open contacts 26. However, once the relay is triggered on it will remain on (with contacts 26 closed) for short periods of time even though the primary energization for the coil 28 may be intermittent. This is an important feature of this invention. The point 22 is connected by means (not shown) to the existing running light wiring of the trailer. The point 24 from the relay is connected to the existing trailer wiring for the right turn signal lights. The operation of the electrical circuit is quite simple. At night with the running lights energized point 22 has a constant voltage supply thereto and if a right turn is signalled for, at that moment, point 24 will also be energized. Energization of point 24 will cause current to flow through the coil 28 closing the switch contacts 26 and thereby energizing line 18 and side lights 16. It is thus clear that the system will only operate at night when the running lights are energized and for the right lights only when the right turn signal is energized.

The left turn protecting lights are similarly connected. Wiring 38 connects the left side lights 16 to a similar relay 20 which is identical to that of the relay discussed above. The only difference is that point 34 is connected to the left turn signal wiring for the trailer. Of course, when the existing running lights are energized point 22 will be hot and if a left turn is made point 34 then becomes intermittently hot and because of the thermal delay action the contacts 26 will remain closed and the left side lights 16 will be energized throughout the turn. Shortly after a turn is made either right or left points 24 or 34 will become deenergized and shortly thereafter the respective relays will open the respective contacts 26 to deenergize the appropriate side lights.

Another new and novel feature of this invention is in the provision for additional protecting lights in the form of backup lights 40. These, of course, would be mounted at the rear of the trailer. These are connected by wiring 42 to a third thermal active relay shown in the center of FIG. 2. This relay is identical to the first two relays described above and has the same reference numerals applied thereto. The difference here is in the connection of said relay to the energization circuits. Wiring 44 connects the switch contact portion of the relay to the right side wiring 18, and wiring 46 connects the energization coil 28 to the left side wiring 38. It can thus be seen that when both the lines 18 and 38 are energized then the backup switch relay will operate to energize the backup lights 40. The only time that both lines 18 and 38 are energized is when both the existing running light circuit is energized and both turn signal lines connected to points 24 and 34 as above are energized. This condition occurs when the operator puts his normal turn signal indicator into the emergency position. As is well known when put into emergency position all the turn signal lights intermittently flash and of course the points 24 and 34 are being intermittently energized.

This lighting protecting system is quite unique and offers many advantages over any known prior art system. It uses the existing wiring systems in a trailer and only adds the minimum of extra parts. It gives the operator full control over these additional lights and gives him added flexibility when turning and/or backing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trailer protector light system for use with an over-the-road machine having rear wheels which are difficult to observe at night, the system comprising:
   a. additional lights for mounting at the rear of the machine; and
   b. means for connecting and operating said lights from the existing lighting system of the machine which includes both the running lights wiring and the turn signal lights wiring so that the additional lights will be energized to a steady state only when both the normal running lights are on and the turn signal system is energized.

2. The device as defined in claim 1 wherein the means for connecting said lights include relay means for connection to the running light system wiring and the turn signal light system wiring of the machine.

3. The device as claimed in claim 2 wherein the relay means includes at least one time delay relay which has a longer delay time than the flasher internal of the turn signal system.

4. The device as claimed in claim 3 wherein two such relays are provided with one relay being connected between the running light system wiring and the right turn signal system wiring and the other relay is connected between the running light system wiring and the left turn light system wiring.

5. The device of claim 4 including third relay means connected to the running light system wiring and the turn signal system wiring so as to energize backup lights from this wiring only when both the running light system wiring has been energized together with the emergency position of the turn signal system.

6. In a tractor-trailer rig having running lights, turn and/or emergency lights, wiring system for said lights, cab mounted switches for activating said systems, the improvement comprising: additional lights mounted at the rear of the trailer; and means for connecting said additional lights to both the existing running light wiring system and the turn and/or emergency light wiring system so that the additional lights will only be energized to a steady state when both the normal running lights are on and the turn and/or emergency light system is energized.

7. The device as claimed in claim 6 wherein the connecting means includes relay means for controlling the additional lights.

8. The device as defined in claim 7 wherein the relay means includes at least one time delay type relay having a time period longer than the flasher unit period of the turn and/or emergency light system.

9. The device as claimed in claim 8 wherein two such time delay type relays are provided with one said relay being connected to the right turn signal wiring and the other said relay being connected to the left turn signal wiring, and both relays being connected to the running light wiring system for energization therefrom.

10. The device as claimed in claim 9 wherein a third relay means for energizing backup lights is included.

11. The device of claim 6 wherein the means for connecting the lights to the existing wiring system includes further means for actuating backup lights when both the running light wiring system is energized and the turn and/or emergency wiring system is energized in the emergency manner.

12. The device of claim 11 wherein the further means for connecting and operating the backup lights includes a relay connected between the running light wiring system and the turn signal wiring system so that when the turn signal wiring system is put in emergency position the backup lights will be energized.

* * * * *

UNITED STATES PATENT OFFICE
CERTIFICATE OF CORRECTION

Patent No. 4,024,497  Dated May 17, 1977

Inventor(s) Raymond A. Ruppel et al.

It is certified that error appears in the above-identified patent and that said Letters Patent are hereby corrected as shown below:

Joseph Z. Fagle corrected to -- Joseph Z. Eagle --.

Signed and Sealed this

Thirteenth Day of September 1977

[SEAL]

Attest:

RUTH C. MASON
Attesting Officer

LUTRELLE F. PARKER
Acting Commissioner of Patents and Trademarks